United States Patent [19]

Hilbrans et al.

[11] 4,447,261
[45] May 8, 1984

[54] METHOD FOR SEPARATING NON-FERROUS METALS FROM IRON-CONTAINING MATERIALS

[75] Inventors: Hermann Hilbrans, Langenfeld; Chatty Rao, Bergisch Gladbach, both of Fed. Rep. of Germany

[73] Assignee: Klöckner-Humboldt-Deutz AG, Fed. Rep. of Germany

[21] Appl. No.: 319,939

[22] Filed: Nov. 10, 1981

[30] Foreign Application Priority Data

Nov. 14, 1980 [DE] Fed. Rep. of Germany ....... 3042941

[51] Int. Cl.³ ..................... C01G 9/03; C01G 21/00; C22B 1/24; C22B 1/16
[52] U.S. Cl. ............................... 75/5; 75/3; 75/4; 75/25; 423/107; 423/97; 423/138
[58] Field of Search ............................. 75/5, 25, 3, 4; 423/107, 97, 138

[56] References Cited

U.S. PATENT DOCUMENTS

| | | | |
|---|---|---|---|
| 2,805,141 | 9/1957 | Apuli et al. | 75/5 |
| 3,262,771 | 7/1966 | Ban | 75/4 |
| 3,311,465 | 3/1967 | Ban et al. | 75/5 |
| 3,313,617 | 4/1967 | Ban et al. | 75/5 |
| 3,850,613 | 11/1974 | Allen | 75/4 |

FOREIGN PATENT DOCUMENTS

| | | | |
|---|---|---|---|
| 489386 | 3/1975 | Australia | 75/25 |
| 46146 | 2/1982 | European Pat. Off. | 75/25 |

*Primary Examiner*—Edward J. Meros
*Assistant Examiner*—Chung K. Pak
*Attorney, Agent, or Firm*—Hill, Van Santen, Steadman & Simpson

[57] ABSTRACT

A method for separating non-ferrous metals from an iron-containing waste material which includes providing separate contiguous layers of the waste material and a sintering mixture containing a finely divided carbonaceous fuel, passing hot combustion supporting gases, first through the layer of sintering mixture and then through the layer of waste material in a sintering zone under conditions sufficient to sinter the iron containing constituents, and volatilizing off the non-ferrous metals to produce a charge suitable for feeding to a blast furnace.

9 Claims, 1 Drawing Figure

METHOD FOR SEPARATING NON-FERROUS METALS FROM IRON-CONTAINING MATERIALS

BACKGROUND OF THE INVENTION

1. Field of the Invention

This invention is in the field of separating non-ferrous metals such as lead and zinc from waste materials containing recoverable amounts of iron by controlled sintering conditions utilizing a layered arrangement in a sintering zone.

2. Description of the Prior Art

In blast furnace and sintering processes, as well as in steel production, iron-containing wastes occur in considerable amounts as a flue dust. The treatment of these materials for recovering the iron values can be carried out, for example, by means of incorporating the same into a sinter charge for a blast furnace. As a practical matter, such a procedure encounters difficulties because of the additional non-ferrous metals such as zinc and lead which are usually present. Zinc enters into a blast furnace process both from the ores employed and the additives as well as from the recycled zinc-containing blast furnace flue dust. Zinc carriers appear in steel production as an unavoidable contaminant in this iron scrap to be processed. Steel-containing coatings and anti-corrosion composites containing zinc also contribute additional sources of zinc.

The zinc component in the charge fed to a blast furnace, however, must be limited to minimize the occurrence of injurious zinc circulations which are caused by continuing cyclical vaporizations in the lower zones of the blast furnace, and condensation in the upper zones thereby causing the formation of zinc deposits. These deposits can cause damage in the area of the walls. In order to avoid these difficulties, the use of such iron and zinc-containing waste materials has been abandoned in some instances but they have to be stored at special dumping sites which provide substantial cost. The storage of these waste materials is not only uneconomical but also represents a distinct burden on the environment.

Pyrometallurgical methods for the elimination of zinc from circulation in a blast furnace sintering system are described in "Stahl-und Eisen", Volume 98, 1978, No. 20, pages 6 through 14. In this article, there is described a zinc removal which occurs during the sintering process. According to the disclosure, 90% of the zinc contained in a sinter mixture to which 30% coke has been added can be removed from the mixture using a reduced amount of air, i.e., under reducing conditions. There is a disadvantage, however, in that there is a decrease of the sinter yield. The creation of reducing conditions by means of incorporating a corresponding excess of coke distributed throughout the entire sintering material charge, however, also results in an increased proportion of iron oxide (FeO) and thus provides a decreased solidity of the sintered product produced. In addition, the formation of iron silicates subsequently results, and their reduction in the blast furnace requires an additional coke charge. Consequently, particularly in view of the economic feasibility of the overall process, this method for removing zinc components from iron-containing waste materials has not been considered satisfactory.

SUMMARY OF THE INVENTION

In accordance with the present invention, we provide a method which avoids the aforementioned disadvantages, and makes possible an economic separation of non-ferrous metals, particularly zinc and lead, from iron-containing waste materials. It provides a method for utilizing such waste materials as a sintering material to produce a charge suitable for a blast furnace process.

The present invention provides a sintering zone into which there is introduced a layer of the waste materials containing non-ferrous metals as well as iron, in combination with a contiguous layer of sintering material of conventional composition. The layer containing the waste materials is disposed at that side of the charge at which the hot gases required for the sintering operation emerge from the charge. In contrast to the method described previously in the reference "Stahl and Eisen", there is no charge sintered in which the zinc components are uniformly distributed. On the contrary, there is only one layer in the charge which contains these zinc components. The zinc is reduced and converted into its vaporous phase during the sintering operation, and leaves the charge along the shortest path due to the spatial arrangement of this layer without undesired reactions with the remaining sintering material occurring. The layered arrangement of normal sintering material and non-ferrous metal containing material further provides the possibility of individually adjusting the process conditions of sintering in the separate layers, whereby the conditions for optimum separation of the non-ferrous components can be achieved within wide limits without adversely affecting the remaining sintering process. Consequently, the quality of the sintered material is improved, particularly with respect to the solidity achieved.

In a preferred form of the present invention, the sintering process takes place in the individual layers of the charge with different fuel/oxygen ratios, whereby a reducing gas atmosphere is provided for sintering the layer containing the non-ferrous components. The use of a reducing gas atmosphere in the entire charge to the sintering furnace would adversely affect the sintering quality. As a result of the layered arrangement, reducing conditions are created only in the area of the layer which contains the non-ferrous metals, and the layer containing the remaining sintering material is treated with normal fuel/air ratios. The reducing gas atmosphere in the layer of waste materials can be achieved by creating an excess of fuel and/or a reduced amount of combustion air as sintering proceeds into that layer.

BRIEF DESCRIPTION OF THE DRAWINGS

Further features and advantages arising from the present invention are illustrated in the drawings, in which.

DESCRIPTION OF THE PREFERRED EMBODIMENTS

Figures 1, 2:
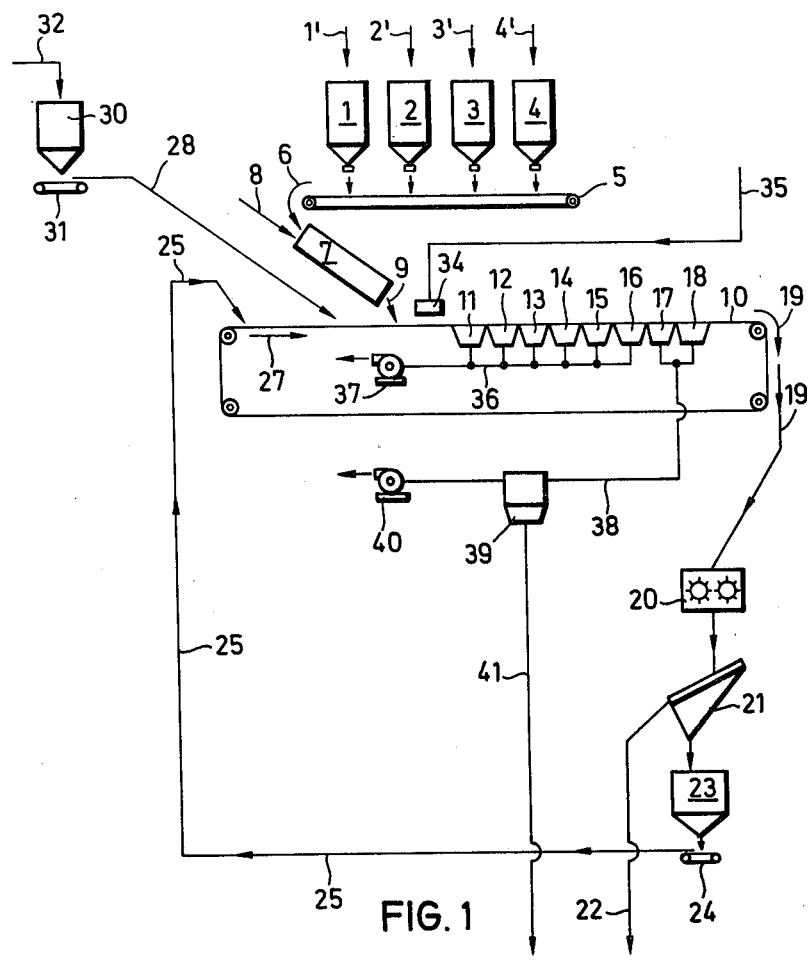
FIG. 1 is a schematic representation of a sintering installation for carrying out the improved method.
FIG. 2 is a cross-sectional view on an enlarged scale of the sintering charge on the belt as it moves through the sintering zone.

Numerals 1, 2, 3 and 4 in FIG. 1 refer to supply hoppers into which are introduced starting materials through lines 1', 2', 3' and 4'. Hoppers 1 and 2 receive ores, hopper 3 receives a charge of coke and hopper 4 contains a calcium source such as limestone.

The materials contained in hoppers 1 through 4 are delivered in metered amounts to a conveyor belt 5. The mixture leaves the conveyor belt 5 as shown by the arrow 6 and subsequently arrives in a granulation drum 7 which is equipped on its input side with a device for injecting water, indicated by reference numeral 8. The dampness of the mixture is adjusted to that required for a granulating process.

The granulated sinterable mixture subsequently arrives onto a porous, grate-type sintering belt 10 which is arranged to pass over a plurality of gas extraction hoods 11 through 18 disposed below the sintering belt. The coarse pieces produced during sintering are delivered as shown by arrow 19 into a comminution means 20. The coarse fraction of the discharge of the comminuting means 20 is available after separation on a screen 21 for use in a blast furnace charge and is conveyed away as indicated by the arrow 22.

By means of a hopper 23 and a metering device 24, the fine fraction separated on the screen 21 is returned to the sintering belt 10 through a conduit 25. As shown in the drawings, this finely divided material forms the bottom layer 26 of the multi-layered mixture which is sintered by passage over the gas extraction hoods 11 through 18.

The layered structure of the charge in the sintering zone is seen in cross section, perpendicular to the conveying direction 27, in FIG. 2. A second layer 29 is delivered onto the sintering belt 10 by means of a conduit 28. The thickness of the layer 29 is from about 5 to 30% and preferably 10 to 15% of the overall thickness of the total layers. The layer 29 consists of iron-containing waste materials which contain non-ferrous metals such as zinc or lead and the like which are harmful in reducing processes in blast furnaces. These waste materials are withdrawn from a hopper 30 by means of a metering conveyor type weigher 31 and may be produced, for example, in a washing stage for exhaust gases of a blast furnace or converter installation. The slurries thus produced are pre-agglomerated by means of suitable well-known methods such as filtration dewatering and are transmitted in this form into the hopper 30 as shown by the arrow 32. In conjunction with this pre-agglomeration, further amounts of ores and, if necessary, calcium-bearing materials can also be added to the waste materials, along with solid fuel. An illustration of the well-known agglomeration processes has been omitted for purposes of clarity. The pre-agglomerated material has a particle size of 3 to 10 mm, and usually about 5 mm. The upper layer 33 of the charge to the sintering zone is the sintering mixture which is received from the supply hoppers 1 through 4. The thickness of the layer 33 is the largest of the multi-layered charge being fed into the sintering zone.

The layer 33 contains coke in an amount required for a normal sintering process, the amount being essentially determined by the thermal requirements. During sintering, reducing conditions which increase the amount of FeO or promote the formation of iron silicates which are difficult to reduce are not desired in this layer, nor are oxidizing conditions, since the temperature would increase too greatly by so doing. The amount of coke in the layer 33 therefore is sufficient to keep the conditions in the layer during sintering at substantially neutral.

Instead, the layer 29 contains an increased amount of coke, more than the normal fuel requirement for the sintering process. The layer 26 has no further fuel added to it, because of its relatively slight thickness.

An ignition means 34 consisting of a gas hood to which hot gases from a hot gas source are supplied via a line 35 is provided. The ignition device 34 serves to initiate the combustion and thus the sintering process.

The gas extraction hoods 11 through 16 are combined at the gas side in a line 36 and are connected to the suction side of a blower 37. The gas extraction hoods 17 and 18 are combined at the gas side in a line 38 and are connected to a gas filter 39 which is connected to the suction side of a blower 40. A line 41 removes the separated solids, i.e., the non-ferrous metals.

During operation of the sintering installation, the combustion process for the sintering zone is initiated by means of the ignition means 34 and begins in the layer 33. The conveying speed of the sintering belt 10 in the direction of the arrow 27 is adjusted in such a manner that the ignition front progressing within the charge from the top to the bottom has reached the layer 29 when the corresponding area of the sintering belt has arrived at the gas extraction hoods 17 and 18. That is, the gas flow conditions or the combustion conditions within the charge can be changed after this point in time by means of the pressure conditions in the gas extraction hoods 17 and 18. A reducing gas atmosphere is now created in the area of the layer 29 where an excess of fuel already exists, and simultaneously, the amount of air drawn by the blower 40 with reference to the gas extraction hoods 17 or 18 is reduced in comparison to the amount drawn through the gas extraction hoods 11 through 16. In this manner, reducing conditions are only created in that part of the sintering charge in which they are actually required. Consequently, zinc is reduced, vaporized, and withdrawn with the remaining exhaust gases. It is then condensed by means of cooling, and separated in the gas filter 39 from the exhaust gas stream, for removal by means of a line 41. The exhaust gas passing through the blowers 37 and 40 can be discharged into the open air by means of a chimney after such gases traverse a scrubbing stage (not illustrated).

The method of the present invention makes possible an economic separation of non-ferrous metals such as zinc from iron-containing flue dusts of blast furnaces or converter systems so that these zinc-free dusts can be reintroduced into the blast furnace process for recovering and utilizing the iron content without complications.

The following specific example illustrates the results achieved from the improved process of this invention.

EXAMPLE

A mixture formed of 1,000 kg converter dust derived from the solids content of a washing stage of the exhaust gases of a converter, 1,000 kg magnetite concentrate and 850 kg coke particles with a grain size smaller than 100 microns were agglomerated by means of filtration dewatering and supplied as a 5 cm thick agglomerate layer to the grate coating of a sintering pan. Above this, a layer consisting of 25 cm thickness composed of a normal sintering mixture was applied. The sintering mixture contained 6% coke. The ignition and sintering processes were initiated in the standard manner. As soon as the ignition front reached the zinc-containing agglomerate layer, a reducing atmosphere was created in the layer due to the high amount of available coke. The reduction potential was sufficient to reduce and volatilize the contained zinc. The zinc was collected as zinc oxide below the sintering grate in a cloth filter. A material balance showed that 90% of the zinc content had been removed from the agglomerate charge.

It will be evident that various modifications can be made to the described embodiments without departing from the scope of the present invention.

We claim as our invention:

1. A method for separating non-ferrous metals from an iron-containing waste material which comprises:
   providing separate contiguous gas permeable layers of (1) said waste material in granular form and (2) a sintering mixture containing predominantly iron oxides and a finely divided carbonaceous fuel also in granular form, said waste material layer being thinner than and lying below said layer of sintering mixture, and
   passing hot combustion supporting gases first through said layer of sintering mixture and then through said layer of waste material in a sintering zone under conditions sufficient to sinter the iron-containing constituents and volatilize the non-ferrous metals.

2. A method according to claim 1 in which said non-ferrous metals include zinc and lead.

3. A method according to claim 1 which includes the step of:
   controlling the conditions in said sintering zone so that the hot gases become more reducing as sintering proceeds into the layer of said waste material.

4. A method according to claim 3 which includes the steps of:
   pre-agglomerating said waste material prior to introducing the same into said sintering zone, and
   adding fuel and a calcium source to said waste material,
   the amount of fuel added being in excess of the amount required for sintering.

5. A method according to claim 4 in which:
   said waste material, fuel and calcium source are pre-agglomerated to a particle size of from 3 to 10 mm.

6. A method according to claim 4 in which:
   said waste material, fuel and calcium source are pre-agglomerated to a particle size of about 5 mm.

7. A method according to claim 3 which includes the step of:
   reducing the amount of air in said combustion supporting gases as sintering proceeds into said layer of waste materials, thereby creating a reducing atmosphere in said layer.

8. A method according to claim 1 in which:
   the thickness of the layer of waste material constitutes from 5 to 30% of the total thickness of the layers in said sintering zone.

9. A method according to claim 1 in which:
   the thickness of the layer of waste material constitutes from 10 to 15% of the total thickness of the layers in said sintering zone.

* * * * *